July 3, 1951
A. J. HORNFECK
2,559,158
SATURABLE REACTOR PHASE SHIFTER
Original Filed March 31, 1945
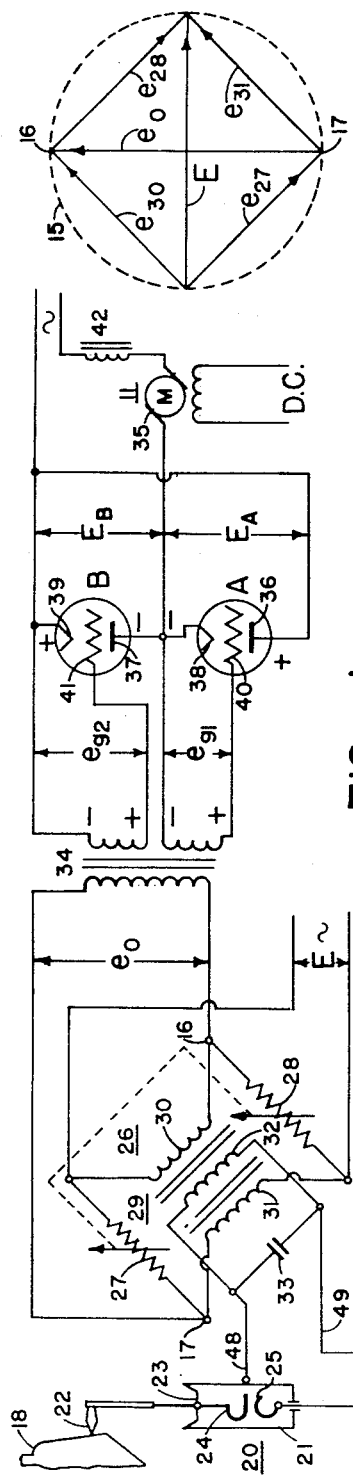
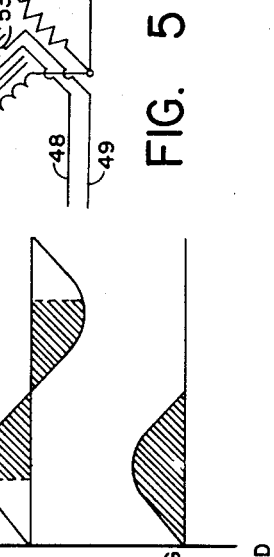
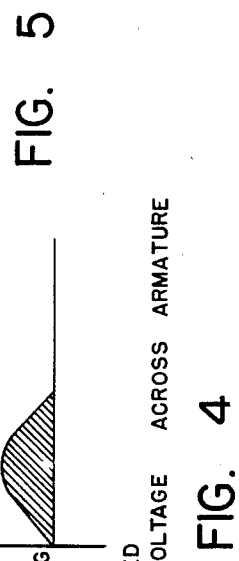
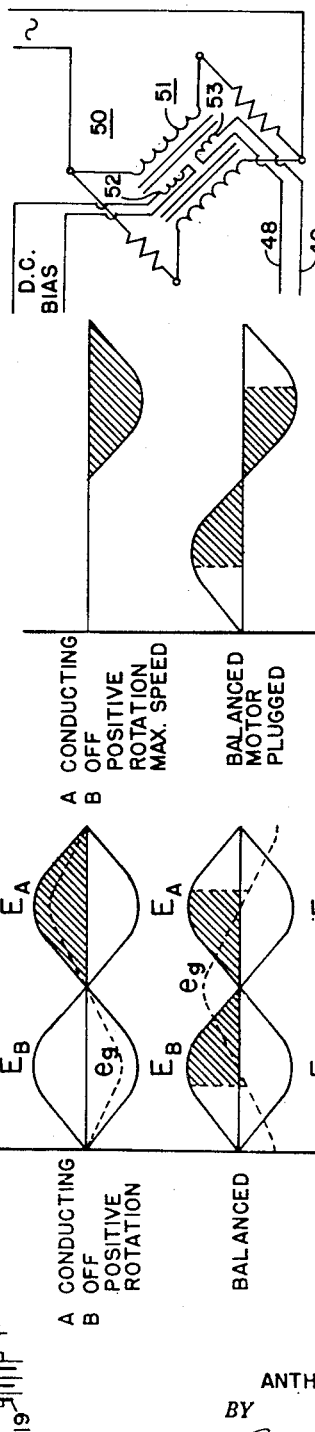
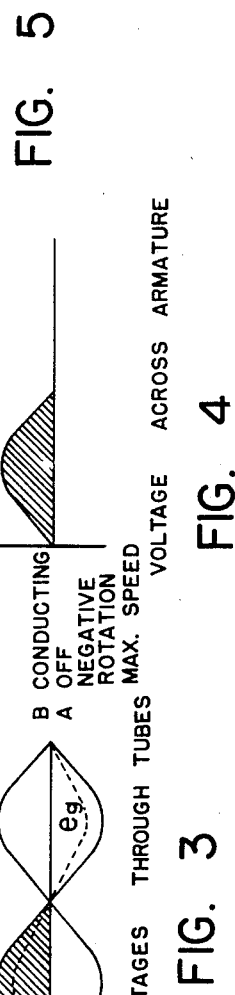
INVENTOR.
ANTHONY J. HORNFECK
BY
Woodling and Kroet
attys Patented July 3, 1951

2,559,158

UNITED STATES PATENT OFFICE 2,559,158

SATURABLE REACTOR PHASE SHIFTER

Anthony J. Hornfeck, Lyndhurst, Ohio, assignor to Bailey Meter Company, a corporation of Delaware Original application March 31, 1945, Serial No. 585,891. Divided and this application February 24, 1950, Serial No. 145,992

4 Claims. (Cl. 323—123)

This invention relates to measuring and controlling systems and apparatus, and more particularly to electrical circuits for motors. It is, of course, to be understood that my invention of an electrical control system is not limited to use with electrical motors, but finds ready application in many other embodiments.

This invention is a division of Serial No. 585,891, filed March 31, 1945.

An object of the invention is to provide an electrical network which is capable of shifting the phase of the output voltage of the network rapidly relative to the unbalancing condition and yet maintaining the output voltage substantially constant.

Another object of the invention is to provide an alternating current bridge having opposite reactance arms on a saturable core reactor with a control winding for the reactor which is energizable from an asymetrical voltage to vary the impedance of the reactance arms.

Still another object of the invention is to provide an alternating current network which comprises a bridge having opposite resistance and opposite reactance arms wherein the opposite reactance arms are included in a single saturable core reactor structure and wherein the impedance of these latter arms are variable by applying a direct current to a control winding on the reactor whereby the bridge has an alternating current output which remains substantially constant in magnitude and shiftable in phase relative to the alternating current source energizing the bridge.

A further object is to provide improved electrical phase shifters for motors and other controlling apparatus sensitive to minute forces or movements.

Other objects and a fuller understanding of the invention may be had by referring to the following description and claims, taken in conjunction with the accompanying drawings, in which:

Figure 1 is a circuit diagram of a motor control system;

Figure 2 is a vector diagram of the voltage vectors obtainable across the phase shift bridge 26, shown in Figure 1;

Figures 3 and 4 are graphs of voltage conditions in tubes A and B and through the armature, respectively, of Figure 1; and Figure 5 shows a different form of phase shifting bridge that may be used in place of the bridge in Figure 1.

In Figure 1, I have shown a complete electrical circuit for controlling a motor 11 in accordance with a variable condition, and for purposes of illustration, this variable condition may be such as is afforded by a pattern 18 and a tracer 22 which may have relative movement therebetween up and down, as shown in Figure 1. The tracer 22 is adapted to move a movable anode 24 within an electron discharge device 20, shown as a two-element tube having the anode 24 and a heated cathode 25. The anode 24 is permitted to move by a flexible diaphragm 23 which forms a part of the envelope 21. Variations in movement of the anode 24 causes variations in the impedance of this electron discharge device 20, and hence may be used to effect control of a phase shift bridge 26. Such an electron discharge device may be as shown and described in the patent to McArthur 2,142,857, and has been shown here in a quite diagrammatic fashion. In Figure 1 I have shown an electrical control circuit whereby the direction and speed of rotation of the motor 11 is controlled by the interaction of tracer arm 22 with the template 18. In general the arrangement of Figure 1 provides a phase sensitive bridge or network 26 controlling the motor 11 through the agency of electron discharge devices A and B. The description is premised on ideal electrical circuit conditions, and for simplicity the motor control circuit will be described under conditions of full speed rotation of the motor in either direction, or under a balanced condition of no rotation. It will be apparent to those skilled in the art, as the description proceeds, how variable speed of rotation of the motor in either direction is accomplished between the limits of maximum speed of rotation and zero speed.

In Figure 3 I have plotted voltage values through the tubes A and B for zero rotation and for full speed motor rotation in either direction. In Figure 4 I have similarly plotted voltages across the armature of the motor 11 under the same operating conditions. Description will now be had with reference to Figures 1, 2, 3 and 4.

The phase sensitive bridge 26 is an alternating current bridge having a source of alternating current supply whose voltage is designated as E. The bridge comprises opposite resistance legs 27, 28 simultaneously hand adjusted as illustrated. The remaining two legs 30 and 31 of the bridge are reactive legs whose impedance is equal to each other and to the resistance of the legs 27, 28. With such a bridge the output voltage $e_0$ is 90 degrees out of phase with the bridge alternating current supply E.

The Figure 2 is a vector diagram showing the vectors obtainable from the phase shift bridge 26.

The alternating current input voltage E has been shown as horizontal on this Figure 2 with the voltage vectors of the four arms of the bridge being designated as $e_{27}$, $e_{28}$, $e_{30}$ and $e_{31}$, respectively. The output voltage vector $e_0$ has been shown as vertical on this vector diagram and as joining the output terminals 16 and 17. It will be seen that this output voltage $e_0$ is 90 degrees out of phase with the input voltage E, and it will be further seen that variations in the impedance of the arms 30 and 31 will shift the potentials of the points 16 and 17 about a substantially circular locus 15 in such a manner that the output voltage $e_0$ remains substantially constant and yet may shift in phase nearly 180 degrees relative to the input voltage E.

The two reactive legs 30, 31 form alternating current windings of a saturable core reactor 29 having a direct current saturating winding 32, shunted by a capacitor 33, and joining a direct current power source through the electron device 20. Thus positioning of the anode 24 relative to the cathode 25 (of the device 20), through the interaction of tracer 22 with template 18, varies the direct current applied across leads 48 and 49 to the saturating winding 32 from a battery 19, and thus varies the reactance or impedance to alternating current flow through the bridge legs 30, 31.

The network is normally biased so that some direct current is flowing through the winding 32, but not enough to result in motor rotation. Such a "neutral" condition exists when the tracer arm 22 is slightly biased in a clockwise direction (Figure 1) by pressure against the template 18. From such position a rise or recession of the shape of the template encountered will cause a deflection of arm 22 further clockwise or in a counterclockwise direction, respectively. This will result in a variation in the amount of direct current flowing through the saturating winding 32, and will result in shifting of the phase of the bridge output voltage $e_0$ in one direction or the other relative to the phase of the bridge supply voltage E, and in degree dependent upon the amount of direct current flow (relative to the neutral value) through the saturating winding 32 and correspondingly upon the direction and amount of deflection of the arm 22.

Control tubes A and B are connected back to back with their grids in phase, but the plates 180 degrees out of phase. The grid voltages $e_{g1}$ and $e_{g2}$ are (as shown) equal and in phase; the grid transformer 34 serving to separate and insulate the grid circuits of the tubes A and B.

At balance, i. e., with the motor stationary, the grid voltage $e_g$ is 90 degrees out of phase with tubes A and B. For example, it is plus 90 degrees with reference to A and minus 90 degrees with reference to B. This is shown in the "balanced" graph of Figure 3. Voltage conditions through the armature 35 of motor 11 are shown in the "balanced" graph of Figure 4, wherein actually the armature receives equal alternate voltages of opposite polarity to effectively plug it against rotation. The curves of Figures 3 and 4 are plotted on theoretical ideal values for explanatory purposes only. Actually the armature voltage will be distorted by inductance.

The value of $e_0$, and consequently of $e_g$, remains substantially constant under the assumed ideal condition of maximum tube conductance. The phase of $e_0$ however is capable of being shifted by the bridge until $e_g$ is completely in phase with tube A for full speed motor rotation in one direction, or completely in phase with tube B for full speed motor rotation in the opposite direction. The first condition is shown in the upper graph of Figure 3, while the upper graph of Figure 4 shows the armature receiving pulsating direct current of one sign. The condition for full speed reverse direction rotation is shown in the lower graphs of Figures 3 and 4.

The electron discharge devices A and B are indicated as having plate anodes 36 and 37, control grids 40 and 41, and heated filament cathodes 38 and 39, respectively. The cathode 38 of tube A is connected to the anode 37 of the tube B, while the anode 36 of tube A is connected to the cathode 39 of tube B.

Inasmuch as I supply both the grid and the plate of each tube with an alternating current, the phase relation between the grid and plate voltage determines the point in the wave at which current begins to pass in each cycle; hence, the average amount of current passing through the tube. Current can pass through a tube in only one direction, and inasmuch as the two tubes A and B are opposedly connected in parallel in the alternating current circuit shown, each tube will pass one-half of the alternating current wave. I may vary the amount of current passing through each tube by causing a shifting of the phase of the grid voltage relative to the plate voltage, which is accomplished as previously mentioned by the phase shifting bridge or network 26.

As mentioned, the grids of the two tubes A and B are in phase, but the plates are out of phase by 180 degrees. Voltages $e_{g1}$ and $e_{g2}$ are always equal, so that the tubes are both conducting during one-half cycle in the neutral condition. During one-half cycle the grid is in phase with the plate of each tube, and therefore an alternating current plate current is flowing through the motor. This current flow through the tubes A and B is illustrated by the shaded sectioning on the "balanced" graph of Figure 3, and on the "balanced" graph of Figure 4 is illustrated by the shaded portions the voltages across the armature 35. In Figure 3 both shaded sections are above the line as current flows through the tubes in the same direction. However, the voltage through the armature 35 is positive from one tube and negative from the other as illustrated in Figure 4, and thus in the neutral or "balanced" condition the motor is plugged because alternate half cycles are in opposite direction.

With reference to the bridge, under one condition of unbalance there is an increase in direct curent flow and under the other condition of unbalance there is a decrease of direct current flow, and this causes an unbalance of the circuit in one direction or the other, or a shifting of phase in the output bridge voltage $e_0$ relative to the supply voltage E. Unbalance, for example an increase, in direct current flowing through the saturating winding 32, reduces the impedance of bridge legs 30 and 31. They become unbalanced relative to legs 27 and 28, which makes the reactance less than the resistance. This shift in phase of $e_0$ is above or below 90 degrees out of relation with E. As the grid voltage swings for an increase or decrease, toward the right or toward the left, it tends to bring it nearer in phase with the tube A (or B) or nearer 180 degrees out of phase with B (or A). If A is fully conducting (and B is off) the motor runs in one direction on pulsating direct current, smoothed out by the choke 42.

The Figure 5 is a modification of the phase shift bridge 26, shown in Figure 1, and shows a bridge 50 having a saturable core reactor 51 which has a first and a second direct current control winding 52 and 53, respectively. The first control winding 52 is shown as being energizable from a source of direct current bias, and the second control winding 53 is shown as being energizable from the leads 48 and 49, which may be the same as the leads 48 and 49 of the circuit of Figure 1. Other elements of the bridge 50 may be the same as that in the bridge 26.

The bridge 50 has additional advantages over the bridge 26 in that the two control windings 52 and 53 may be used to magnetically combine the fluxes or magnetomotive forces caused by separate voltages and hence two direct curent circuits may be electrically insulated and yet combine to produce a resultant magnetomotive force upon the saturable core reactor 51. Still further the curent flowing through the control windings 52 and 53 may provide additive magnetomotive forces or they may establish opposing magnetomotive forces acording to the particular use intended for that phase shift bridge 50.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An alternating current network comprising a bridge having two alternating current input terminals, a pair of parallaled branch paths each including only a series connected resistance arm and reactance arm connected between said input terminals, an output terminal connected at the junction of the resistance and reactance arms in each branch path, said reactance arms being oppositely disposed in said bridge and included in a single saturable core reactor structure, an asymmetric current control winding for the reactor for varying the impedance of the reactance arms, and an alternating current output from the network at said output terminals, the voltage of the output remaining substantially constant and its phase being shiftable relative to the phase of said input by variation in the amount of asymmetric current supplied to said control winding.

2. An alternating current network comprising a bridge having two input terminals, a pair of paralleled branch paths each including only a series connected resistance arm and reactance arm connected between said input terminals, an output terminal connected at the junction of the resistance and reactance arms in each branch path, said reactance arms being oppositely disposed in said bridge and included in a single saturable core reactor structure, a direct current control winding on the core of the reactor for varying the impedance of the reactance arms, means for applying an alternating current voltage to said two input terminals, said output terminals being the alternating current output from the network, the alternating voltage of the output remaining substantially constant in magnitude and its phase being shiftable relative to the phase of said input by variation in the amount of direct current supplied to said control winding.

3. An alternating current network comprising a bridge having two alternating current input terminals, a pair of paralleled branch paths each including only a series connected resistance arm and reactance arm connected between said input terminals, an output terminal connected at the junction of the resistance and reactance arms in each branch path, said reactance arms being oppositely disposed in said bridge and included in a single saturable core reactor structure, first and second asymmetric current control windings for the reactor for varying the impedance of the reactance arms, and an alternating current output from the network at said output terminals, the phase of the output voltage being shiftable relative to the phase of said input by variation in the amount of asymmetric current supplied to said control windings.

4. An alternating current network comprising a bridge having two input terminals, a pair of paralleled branch paths each including only a series connected resistance arm and reactance arm connected between said input terminals, an output terminal connected at the junction of the resistance and reactance arms in each branch path, said reactance arms being oppositely disposed in said bridge and included in a single saturable core reactor structure, first and second direct current control windings on the core of the reactor for varying the impedance of the reactance arms, means for energizing said control windings, means for applying an alternating current voltage to the input terminals of the network, and an alternating current output from the network at said output terminals, the voltage of the output remaining substantially constant and its phase being shiftable relative to the phase of said input by variation in the amount of direct current supplied to said control windings.

ANTHONY J. HORNFECK.

REFERENCES CITED

The following references are of record in the file of this patent:

UNITED STATES PATENTS

| Number | Name | Date |
|---|---|---|
| 1,824,577 | Sorensen | Sept. 22, 1931 |
| 1,920,803 | Nagasher | Aug. 1, 1933 |
| 2,149,092 | Kettler | Feb. 28, 1939 |
| 2,358,103 | Ryder | Sept. 12, 1944 |
| 2,432,399 | Edwards | Dec. 9, 1947 |